Feb. 15, 1938.      N. M. THOMAS      2,108,418
WRAPPED FROZEN CONFECTION
Filed Feb. 13, 1933

INVENTOR
Norman M. Thomas
BY
ATTORNEY

Patented Feb. 15, 1938

2,108,418

UNITED STATES PATENT OFFICE 2,108,418

WRAPPED FROZEN CONFECTION

Norman M. Thomas, Brooklyn, N. Y., assignor to Joe Lowe Corporation, a corporation of Delaware Application February 13, 1933, Serial No. 656,551

3 Claims. (Cl. 99—180)

The present invention relates to frozen confections and one of the objects of the present invention is to provide an improved wrapped unit service confection including a frozen body of ice cream, sherbet, flavored ice, or the like having the lower part thereof disposed within and bonded to an edible container and the upper part thereof disposed within and bonded to an inedible container which latter container also surrounds the edible container.

Further objects and advantages will be apparent from the following description, reference being had to the accompanying drawing, wherein a preferred form of embodiment is clearly shown.

Figures 1, 2:
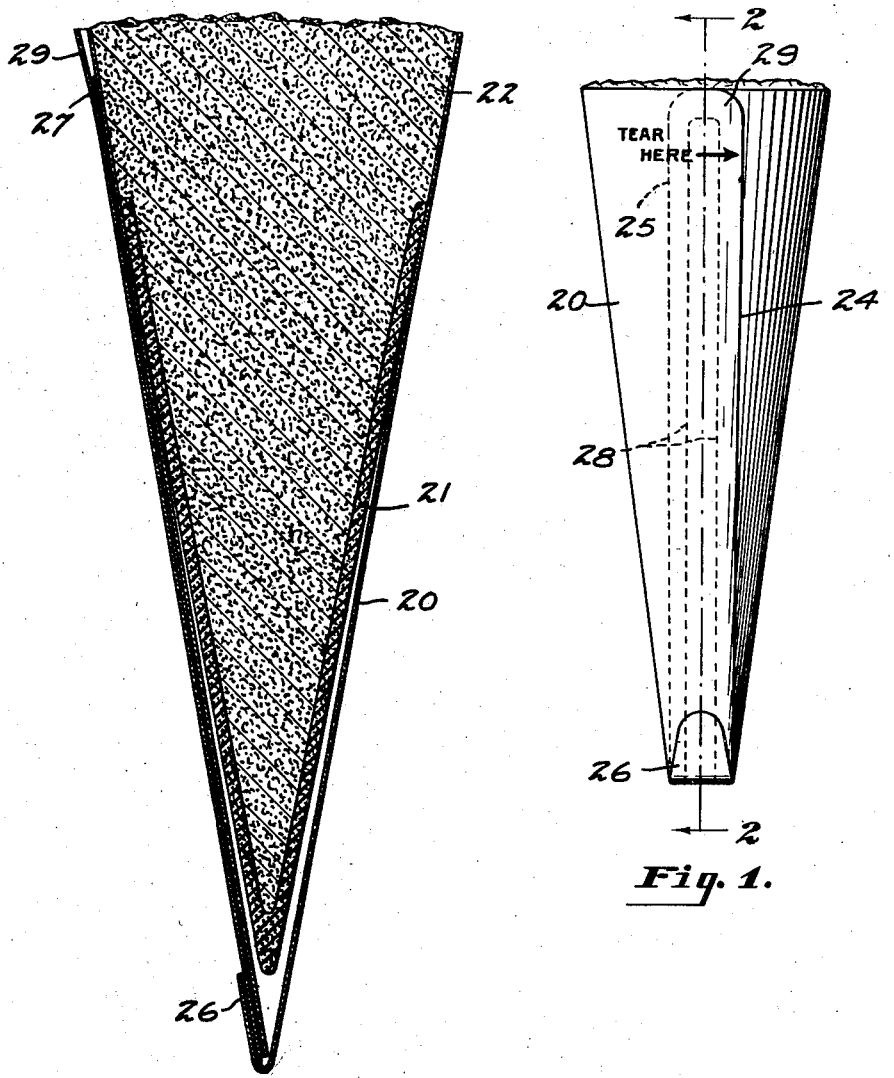
Fig. 1 is a side view of my improved confection.
Fig. 2 is a longitudinal vertical section thereof on a somewhat larger scale.

Referring to the drawing, the confection illustrated comprises an edible cone 21 which is formed by rolling or molding and which may be coated and impregnated with a flavored material such as chocolate. This cone 21 is incased in a cone shaped bag 20 made of any suitable material such as moistureproof paper or "Cellophane". The cone 21 is placed in the bag 20 and the edible substance 22, such as ice cream mix, sherbet mix, or the like, is placed in the cone and bag while such substance is in a non-frozen state. The bag 20 is then substantially filled with the mix and then the mix is refrigerated to harden the mix and to cause the mix to bond, by freezing, to the cone and the bag. By virtue of this bonding, the ice cream will not readily slide out of the cone and bag during the handling thereof. The cone is filled with the solid frozen edible substance 22, and therefore it is not easily crushed.

The filled cone and the bag 20 is sold as a unit service confection. The entire bag 20 may be removed from the confection before eating the confection or parts of the bag can be torn away as the confection is being eaten, the bag being constructed for this purpose. The edges 24 and 25 of the material forming the bag overlap and the bottom of the material is folded upon itself as at 26 to close the bottom of the bag 20. The folded part 26 and the overlapping edges 24 and 25 are sealed, in a suitable manner as by a paste or by glue, except to the extreme upper part of the overlapping edges which, although overlapped, are not sealed together. In the present illustration, a glue 27 disposed between the dotted lines 28 (Fig. 1), is used for sealing. This unsealed part provides a tab or finger-hold 29 which the consumer may use to start the tearing away of the bag.

In filling the cone 21 and that part of the bag 20 above the cone with the mix, suitable means may be provided for engaging the periphery of the upper part of the bag 20 so as to hold the tab 29 in place and thereby prevent the escape of mix at this point.

After the bag is filled, the unfrozen mix does not escape between the unsealed overlaps because the pressure of the mix on the inner lap forces the same against the outer lap.

Thus it is apparent from the foregoing that I have provided a novel unit service confection. This confection can be made in quantity production; the edible body being bonded to the bag and cone will prevent the edible body from sliding out of bag and will hold the cone in position and the bag provides a sanitary container for the edible confection.

While the form of embodiment of the present invention as herein disclosed constitutes a preferred form, it is to be understood that other forms might be adopted all coming within the scope of the claims that follow.

I claim:

1. As an article of manufacture, a cup adapted to receive an edible confection and made from a blank including an outer edge for defining the mouth of the cup and side edges which are overlapped to form a seam in the cup, said cup being of a conical-like shape so as to enclose an edible cone or the like and being of such length as to extend above the top of the cone so that the upper portion of the cup can serve as a wrapper for ice cream projecting above the top of the cone and which wrapper is adapted to be stripped from the confection to afford access to the ice cream, said upper portion of the cup being aligned with the cone and being of such character and formation as to shape and hold ice cream placed therein and above the cone.

2. As a new article of manufacture, a cup adapted to receive an edible confection and made from a blank including an outer edge for defining the mouth of the cup and side edges which are overlapped to form a seam in the cup, said side edges being held together by an adhesive of such character and location intermediate its overlapped ends as to maintain the form of wrapper and provide a seam having continuous free outer side edges throughout the length thereof which are adapted to serve as a tearing tab in the stripping operation, said cup being of conical like shape so as to enclose an edible cone or the like and being of such length as to extend above the top thereof so that the upper extending portion of the cup can serve as a container and wrapper for receiving the edible substance projecting above the top of the cone and shaping and holding the same therein, said upper portion of the cup being aligned with the cone and designed to shape and hold the edible substance placed therein and above the cone.

3. As a new article of manufacture, a cup adapted to receive an edible confection and made from a blank including an outer edge for defining the mouth of the cup and side edges which are overlapped to form a seam in the cup, said side edges being held together by an adhesive of such character and location as to provide an outer side edge having a free upper portion adapted to serve as a tearing tab in the initial stripping operation and a free side portion extending throughout the length of said seam to provide a continuous tearing tab for successive stripping operations, said cup being of conical like shape so as to enclose an edible cone or the like and being of such length as to extend above the top thereof so that the upper extending portion of the cup can serve as a container and wrapper for receiving the edible substance projecting above the top of the cone and shaping and holding the same therein, said upper portion of the cup being aligned with the cone and designed to shape and hold the edible substance placed therein and above the cone.

NORMAN M. THOMAS.